(12) United States Patent
Mayer et al.

(10) Patent No.: US 7,941,653 B2
(45) Date of Patent: May 10, 2011

(54) JUMP INSTRUCTION HAVING A REFERENCE TO A POINTER FOR ACCESSING A BRANCH ADDRESS TABLE

(75) Inventors: Christopher M. Mayer, Dover, MA (US); Adil Bahadoor, Quincy, MA (US); Michael Long, Arlington, MA (US)

(73) Assignee: Analog Devices, Inc., Norwood, MA (US)

( * ) Notice: Subject to any disclaimer, the term of this patent is extended or adjusted under 35 U.S.C. 154(b) by 328 days.

(21) Appl. No.: 12/328,484

(22) Filed: Dec. 4, 2008

(65) Prior Publication Data

US 2010/0146248 A1 Jun. 10, 2010

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................. 712/238; 712/233
(58) Field of Classification Search .................. None
See application file for complete search history.

(56) References Cited

U.S. PATENT DOCUMENTS

| | | | |
|---|---|---|---|
| 5,101,341 A * | 3/1992 | Circello et al. | 712/213 |
| 5,434,985 A | 7/1995 | Emma et al. | |
| 6,308,322 B1 * | 10/2001 | Serocki et al. | 717/145 |
| 6,457,117 B1 * | 9/2002 | Witt | 712/213 |
| 6,651,162 B1 * | 11/2003 | Levitan et al. | 712/238 |
| 6,721,877 B1 | 4/2004 | Chen et al. | |

OTHER PUBLICATIONS

Calder et al.; The Precomputed-Branch architecture: Efficient branches with compiler support; Jan. 1998; Journal of Systems Architecture.*
International Search Report and Written Opinion, for PCT/US2009/066547, 10 pages.
Reinman G. et al. "Optimizations Enabled by a Decoupled Front-End Architecture" IEEE Transactions on Computers, Apr. 2001, pp. 1-32, XP7911843.
"Indirect Jump", ADSP-219x Instruction Set Reference, Analog Devices, Inc., 2000, pp. 8-45 to 8-47.

* cited by examiner

*Primary Examiner* — Eddie P Chan
*Assistant Examiner* — Corey Faherty
(74) *Attorney, Agent, or Firm* — Bingham McCutchen LLP

(57) ABSTRACT

Methods and apparatus are provided for performing a jump operation in a pipelined digital processor. The method includes writing target addresses of jump instructions to be executed to a memory table, detecting a first jump instruction being executed by the processor, the first jump instruction referencing a pointer to a first target address in the memory table, the processor executing the first jump instruction by jumping to the first target address and modifying the pointer to point to a second target address in the memory table, the second target address corresponding to a second jump instruction. The execution of the first jump instruction may include prefetching at least one future target address from the memory table and writing the future target address in a local memory. The second target address may be accessed in the local memory in response to detection of the second jump instruction.

33 Claims, 11 Drawing Sheets

JUMP INSTRUCTION HAVING A REFERENCE TO A POINTER FOR ACCESSING A BRANCH ADDRESS TABLE

FIELD OF THE INVENTION

This invention relates to execution of jump operations in a digital processor and, more particularly, to a novel jump double indirect instruction and apparatus for implementing the jump double indirect instruction.

BACKGROUND OF THE INVENTION

Jump instructions are commonly included in the instruction set architecture of a digital processor. During sequential program execution, a processor fetches instructions from sequential memory addresses. A jump instruction is used to switch program execution from a first instruction sequence to a second instruction sequence and, either directly or indirectly, specifies a target address. The target address contains the first instruction of the second instruction sequence. When the processor fetches the jump instruction from memory, it jumps to the target address and begins execution of the second instruction sequence.

A program may include multiple jump instructions, each with a different target address. The jump instruction may be used, for example, to execute different subroutines. A jump instruction may be conditional or unconditional. A conditional jump instruction is commonly known as a branch instruction.

Current processors typically use pipelined architectures. Such processors include multiple pipeline stages to achieve high speed operation. Each pipeline stage performs one of the functions involved in instruction execution, such as instruction fetch, instruction decode, data address generation, computation, and the like. Program instructions advance through the pipeline stages on consecutive clock cycles, and several instructions may be in various stages of completion at the same time. Ideally, a pipelined processor can complete execution of one instruction per clock cycle. Performance can be enhanced by providing a large number of pipeline stages. The number of pipeline stages in a processor is commonly referred to as "pipeline depth."

Notwithstanding the enhanced performance provided by pipelined architectures, certain program conditions may degrade performance. An example of such a program condition is a jump instruction. Jump instructions are common in most computer programs, including for example, digital signal processor applications and microcontroller applications. When a jump instruction advances through a pipelined processor and branch prediction is not utilized, sequential instructions follow the jump instruction in the pipeline. When the jump instruction is commits at the end of the pipeline, the pipeline must be cleared by aborting all instructions currently in the pipeline and re-executing instructions beginning at the target address of the jump instruction. The performance penalty increases with the pipeline depth. For deeply pipelined architectures and programs having frequent jump instructions, the performance penalty can be severe.

Branch prediction techniques are known in the art. In a typical branch predictor, a branch cache memory contains the addresses of branch and jump instructions, and corresponding prediction information. When a jump instruction is fetched by the program sequencer, the branch predictor detects the jump instruction based on its memory address. The prediction information contained in the branch cache memory permits the processor to jump to the target address without flushing of the pipeline.

Prior art branch predictors have had limited impact on performance. Accordingly, there is a need for improved methods and apparatus for performing jump operations in a digital processor.

SUMMARY OF THE INVENTION

According to a first aspect of the invention, a method is provided for performing a jump operation in a pipelined digital processor. The method comprises writing target addresses of jump instructions to be executed by the processor to a memory table, detecting a first jump instruction being executed by the processor, the first jump instruction referencing a pointer to a first target address in the memory table, the processor executing the first jump instruction by jumping to the first target address and modifying the pointer to point to a second target address in the memory table, the second target address corresponding to a second jump instruction.

The execution of the first jump instruction may further include prefetching at least one future target address from the memory table and writing the at least one future target address in a local memory. The second target address may be accessed in the local memory in response to detection of the second jump instruction.

According to a second aspect of the invention, a method is provided for performing a jump operation in a pipelined digital processor having a branch predictor. The method comprises writing target addresses of jump instructions to be executed by the processor to a memory table, providing a jump instruction in an instruction set architecture of the processor, the jump instruction referencing a pointer to a target address in the memory table, in response to the branch predictor detecting a first jump instruction, jumping to a first target address and modifying the pointer to point to a second target address in the memory table, the second target address corresponding to a second jump instruction.

According to a third aspect of the invention, apparatus is provided for performing a jump operation in a pipelined digital processor. The apparatus comprises a memory table to store target addresses of jump instructions to be executed, a local memory, and a jump instruction control unit to control execution of a jump instruction that references a pointer to a target address in the memory table, the jump instruction control unit responsive to a first jump instruction to jump to a first target address, to modify the pointer to point to a second target address in the memory table, to prefetch at least one future target address from the memory table and to write the at least one future target address in the local memory.

According to a fourth aspect of the invention, a method is provided for performing a jump operation in a pipelined digital processor. The method comprises writing target addresses of jump instructions to be executed by the processor to a memory table; learning a first jump instruction with a branch predictor of the processor, the first jump instruction referencing a pointer to a first target address in the memory table; fetching the first jump instruction with a fetch block of the processor; detecting the first jump instruction with the branch predictor; reading the first target address corresponding to the first jump instruction from a local memory and providing the first target address to the fetch block of the processor; modifying the pointer to point to a second target address in the memory table, the second target address corresponding to a second jump instruction; prefetching a future target address from the memory table; writing the prefetched future target address to the local memory when the first jump instruction commits; and retiring the first target address from the local memory when the first jump instruction commits.

BRIEF DESCRIPTION OF THE DRAWINGS

For a better understanding of the present invention, reference is made to the accompanying drawings, which are incorporated herein by reference in which.

DETAILED DESCRIPTION

Figure 1:
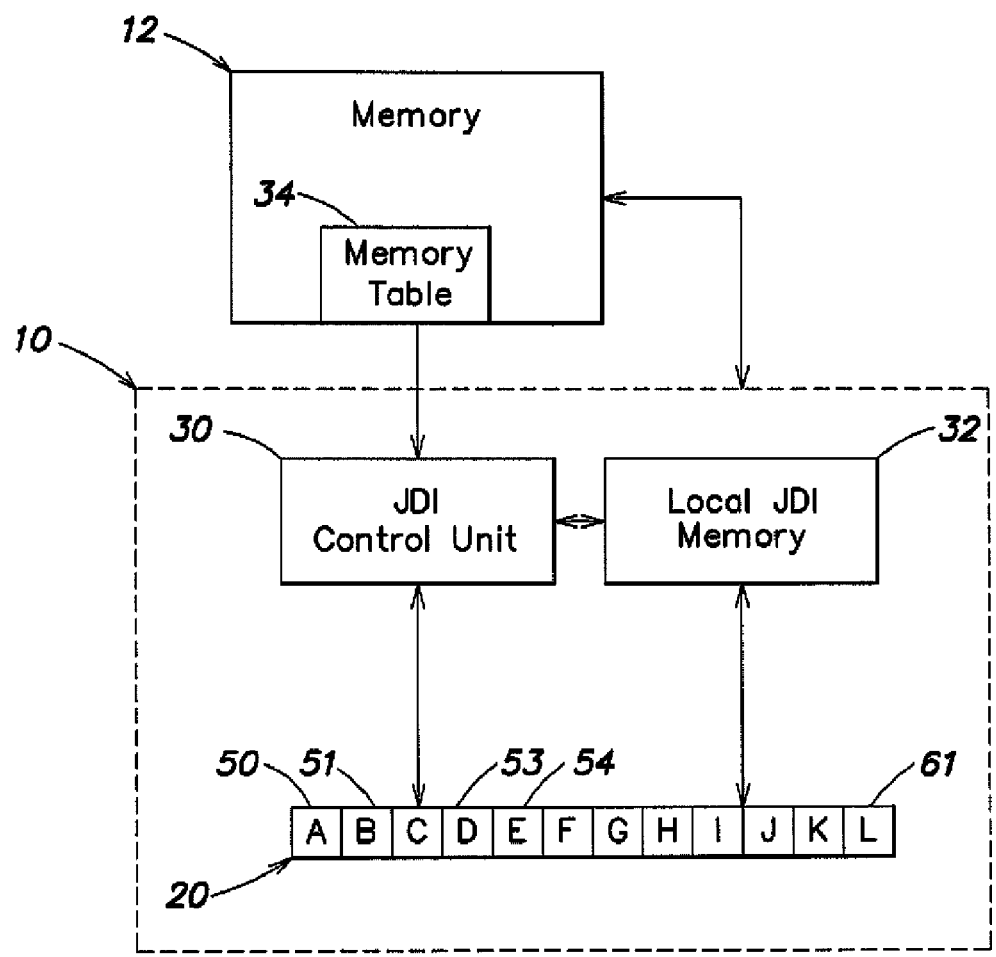
FIG. 1 is a simplified block diagram of apparatus for performing a jump operation in accordance with embodiments of the invention.

A digital processor for processing a jump instruction in accordance with embodiments of the invention is shown in FIG. 1. The digital processor includes a computation core 10 and a memory 12. The computation core 10 and the memory 12 may have a pipelined architecture, as known in the art. The computation core 10 may include a pipeline 20 having stages A-L. The functions involved in instruction execution are performed by functional blocks of the pipeline 20, including an instruction fetch block 50, a branch predictor 51, an instruction decoder 53, a data address generator (DAG) 54, a computation block and a commit block 61. It will be understood that different processor designs may have more or fewer stages, and that each function may require one or more stages of the pipeline. Also, a stage may perform two or more functions.

The digital processor is configured to execute an instruction set including instructions for performing a variety of operations. In accordance with embodiments of the invention, the instruction set includes a novel jump instruction referred to herein as a "jump double indirect" or "JDI" instruction. In a deeply pipelined processor running certain algorithms, JDI instructions can avoid pipeline bubbles while executing jump operations.

Components of the digital processor associated with execution of the JDI instruction are shown in FIG. 1. The computation core 10 includes a JDI control unit 30 and a local JDI memory 32. In addition, memory 12 includes a memory table 34. The JDI control unit 30, local JDI memory 32 and memory table 34 interact with components of pipeline 20 to execute JDI instructions as described below.

The jump double indirect (JDI) instruction can accelerate jump operations when the target addresses of routines to be executed are known before execution of the jump instruction. The instruction syntax can be:

JUMP ([Px++]);

where Px is one of a set of pointer registers which contains a pointer to an entry in memory table 34. The entry in memory table 34 contains the target address of the jump instruction. In addition, the pointer is post modified when the jump instruction commits. There are two levels of indirection in obtaining the next target address, as suggested by the name "jump double indirect."

JDI instructions can be accelerated when two conditions are met: (1) the target address can be computed in advance and placed in the memory table 34, and (2) the JDI instruction is learned by the branch predictor of pipeline 20. Target addresses are precomputed before execution of the JDI instruction and stored in memory table 34. Multiple target addresses can be written to memory table 34 for use by multiple JDI instructions as described below. The memory table may be terminated by an "end table" marker.

Target addresses of JDI instructions are precomputed and written in memory table 34 in the order in which the JDI instructions are to be executed. Each target address in memory table 34 may contain the address of the first instruction of a subroutine to be executed. The pointer register Px is initialized to point to a starting location in memory table 34. If some or all of the JDI instructions corresponding to memory table 34 are to be executed in a loop, the pointer register Px is initialized to point to the start of the loop on each loop iteration. The processor can use a single memory table 34 or can use two or more memory tables if it is desired to execute two or more sets of subroutines. The pointer register Px is initialized to point to a starting location in the memory table to be executed.

JDI instructions are learned by the branch predictor when each instruction is executed the first time. The branch predictor "learns" jump instructions by identifying the jump instructions the first time they are executed in an application program and storing the addresses of those instructions. When the address of the jump instruction is accessed on subsequent iterations of the program, the jump instruction is predicted immediately, before decoding, and execution of the instruction can begin. Once learned by the branch predictor, JDI instructions are detected early in pipeline 20 and predictions are made.

JDI prediction operates on the principle of reading ahead in the memory table 34 of target addresses. When a JDI instruction executes, it may read up to three target addresses, including the target address of the current JDI instruction, located at address [Px]. In addition, target addresses of future JDI instructions, located at addresses [Px+offset], are read. As described below, one or two future target addresses may be read. A small table of future target addresses, local JDI memory 32 in FIG. 1, is utilized to make predictions speculatively when JDI instructions are detected in the fetch stage of the pipeline. Additional prefetches are made to add entries to the local JDI memory 32 each time a JDI instruction is executed.

Figure 2:
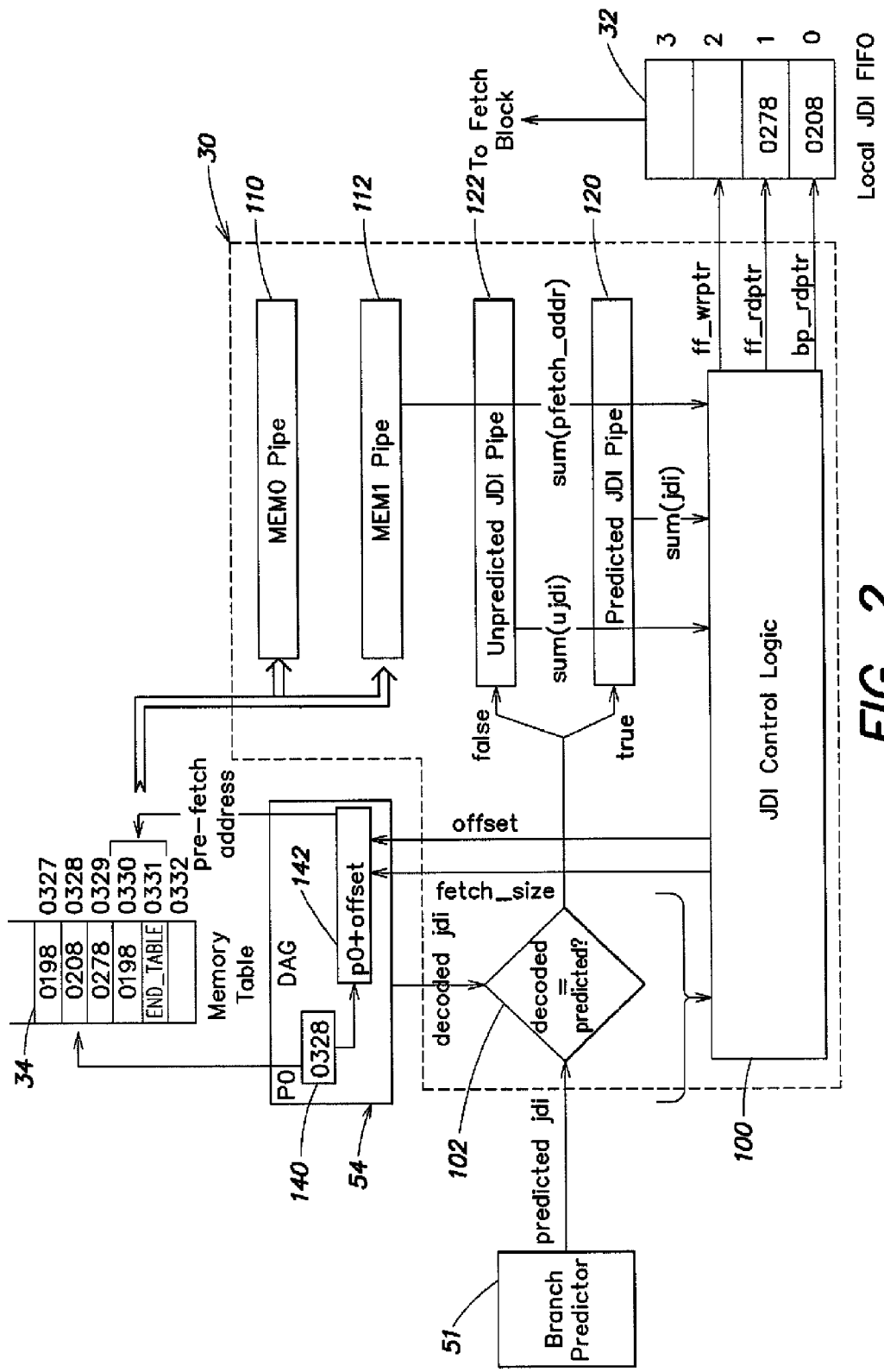
FIG. 2 is a simplified block diagram of jump control apparatus for performing a jump operation in accordance with embodiments of the invention.

The JDI control unit 30 is shown in greater detail in FIG. 2. In the embodiment of FIG. 2, JDI control unit 30 includes JDI control logic 100, a JDI detection block 102, a MEM0 pipe 110, a MEM1 pipe 112, a predicted JDI pipe 120 and an unpredicted JDI pipe 122. The JDI control unit 30 operates in conjunction with elements of pipeline 20, including at least fetch block 50, branch predictor 51, decoder 53, and DAG 54, as well as memory table 34 and local JDI memory 32, to execute JDI instructions. JDI control logic 100 provides fetch size and offset values to DAG 54. DAG 54 contains a pointer register 140 which corresponds to the pointer register Px specified by the JDI instruction. DAG 54 also includes a prefetch register 142 which points to target addresses to be prefetched from memory table 34. Pointer register 140 points to the current target address in table 34, and prefetch register 142 points to a future target address in memory table 34.

The MEM0 pipe 110, the MEM1 pipe 112, the predicted JDI pipe 120 and the unpredicted JDI pipe 122 carry information relating to execution of one or more JDI instructions. The current target address is loaded from memory table 34 into MEM0 pipe 110. One or more future target addresses are loaded from memory table 34 into MEM1 pipe 112. MEM0 pipe 110 and MEM1 pipe 112 may extend from stage H to stage L of pipeline 20. The target addresses read from memory table 34 may be loaded into MEM0 pipe 110 and MEM1 pipe 112 at stage H of pipeline 20. An indicator of a predicted JDI instruction is loaded into predicted JDI pipe 120, and an indicator of an unpredicted JDI instruction is loaded into unpredicted JDI pipe 122. JDI pipes 120 and 122 may extend from stage E to stage L of pipeline 20. The values loaded into pipes 110, 112, 120 and 122 advance through the respective pipes on consecutive clock cycles and are utilized as described below.

The JDI control logic 100 controls local JDI memory 32. In particular, JDI control logic 100 controls writing of prefetched target addresses into local JDI memory 32, reading of target addresses from local JDI memory 32 and retiring of target addresses from local JDI memory 32 after each JDI instruction commits.

The local JDI memory 32 may have a first-in, first-out (FIFO) configuration. In some embodiments, local JDI memory 32 has four locations, also referred to as a depth of four. In the embodiment of FIGS. 2-7, local JDI memory 32 has a FIFO configuration and is labeled "Local JDI FIFO." It will be understood that this configuration of JDI memory 32 is given by way of example only and is not limiting as to the scope of the invention.

The jump double indirect instruction accelerates jumping when the target addresses of multiple subroutines are known in advance. The target addresses are stored in memory table 34, and a current pointer in pointer register 140 points to the current target address of a JDI instruction in decoder 53. A second pointer in prefetch register 142 is a look-ahead pointer which points to target addresses in the memory table 34 for future JDI instructions that have not yet entered pipeline 20. The second pointer uses an offset value and a fetch size to determine the locations in memory table 34 of target addresses to be prefetched.

A JDI instruction in decoder 53 causes the DAG 54 to send the prefetched addresses to the JDI memory 32. The JDI memory 32 thus holds addresses of future JDI instructions that will be predicted by the branch predictor 51 early in pipeline 20. When a predicted JDI instruction commits in commit block 61, it retires the corresponding target address from JDI memory 32 and writes to JDI memory 32 the target addresses that it prefetched from memory table 34 when the JDI instruction passed the decode stage 53.

Table 1 below shows an example of JDI instructions, corresponding pointers contained in pointer register 140 and the target addresses contained in memory table 34. The first JDI instruction, JDI0, references register P0 which contains a pointer to location 327 in memory table 34. Location 327 contains target address 0198. Assume that instruction JDI0 advances through the pipeline 20 and commits. The JDI memory 32 was empty when instruction JDI0 advanced through the pipeline. Thus, instruction JDI0 caused two target addresses, 0208 and 0278, to be prefetched from memory table 34. When instruction JDI0 commits, it writes the two prefetched target addresses into the JDI memory 32.

TABLE 1

| Instruction | Pointer (Px) | Target Address |
|---|---|---|
| JDI 0 | 0327 | 0198 |
| JDI 1 | 0328 | 0208 |
| JDI 2 | 0329 | 0278 |
| JDI 3 | 0330 | 0198 |
| — | 0331 | End_Table |
| — | 0332 | xxxx |

Several pointers are associated with operation of JDI memory 32. An architectural write pointer, ff_wrptr, in a register 130 (FIG. 3) points to the next location in the JDI memory that can be written. An architectural read pointer, ff_rdptr, in a register 132 points to the next location in the JDI memory that can be read. A branch predictor read pointer, bp_rdptr, in a register 134 preincrements to read the target address of the next JDI instruction detected by the branch predictor 51. In the above example, the states of the read pointer, ff_rdptr, and the write pointer, ff_wrptr, of local JDI memory 32 after instruction JDI0 commits are as follows: ff_rdptr points to location 0, which contains target address 0208, and ff_wrptr points to location 2, which is the next empty location in JDI memory 32.

The branch predictor read pointer, bp_rdptr, points to the JDI memory 32 entry which contains the target address of the next JDI instruction to enter the pipeline 20. The branch predictor read pointer is given by $$bp\_rdptr = ff\_rdptr + \text{sum}(ujdi) + \text{sum}(jdi) + \text{sum}(pjdi) \quad (1)$$

where sum(ujdi)=the sum of unpredicted JDI instructions advancing through unpredicted JDI pipe 122, sum(jdi)=the sum of predicted JDI instructions advancing through predicted JDI pipe 120, and sum(pjdi)=sum of predicted JDI instructions in the upstream stages of pipeline 20.

The branch predictor read pointer thus takes into account any JDI instructions currently advancing through the pipeline.

A future FIFO size parameter, future_fifo_size, represents the state of the JDI memory 32 when all the JDI instructions in predicted JDI pipe 120 and unpredicted JDI pipe 122 have committed and written their prefetched target addresses into the JDI memory 32. When the JDI instructions is commit, they also retire addresses from the JDI memory 32. The future FIFO size is utilized to control DAG 54 to prefetch the correct target addresses from memory table 34 when a new JDI instruction is decoded. The future FIFO size is given by $$future\_fifo\_size = fifo\_entries + \text{sum}(pfetch\_addr) - \text{sum}t(jdi) \quad (2)$$

where fifo_entries=the current number of target addresses in JDI memory 32, sum(pfetch_addr)=the sum of addresses prefetched from memory table 34 and advancing through MEM1 pipe 112, and sumt(jdi) is the sum of predicted JDI's advancing through predicted JDI pipe 120 and unpredicted SDI's advancing through unpredicted JDI pipe 122.

Figure 3:
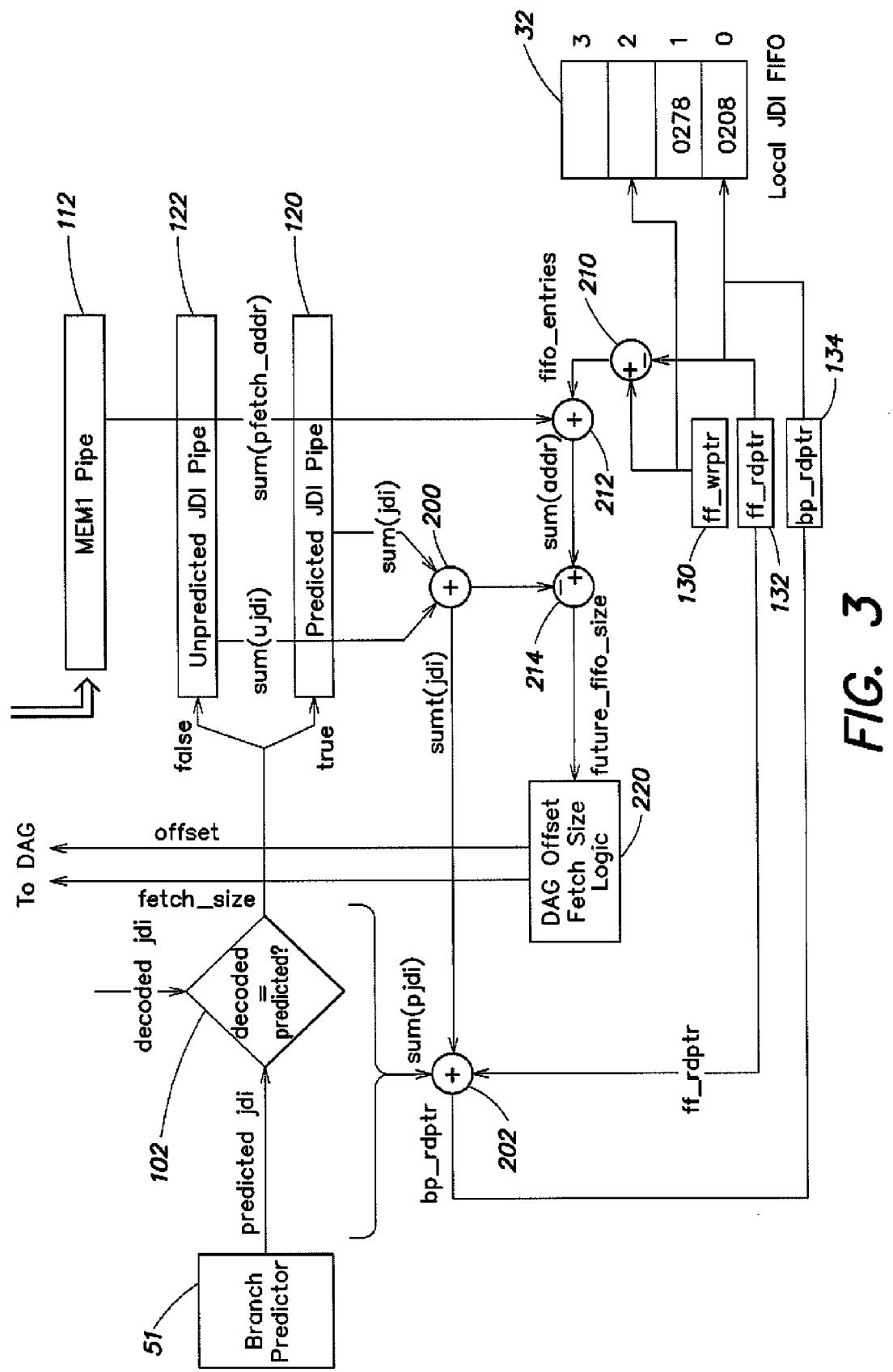
FIG. 3 is a block diagram of the jump control apparatus, illustrating calculation of the branch predictor read pointer and parameters for reading the memory table.

Elements of JDI control logic 100 that determine the branch predictor read pointer, bp_rdptr, are shown in FIG. 3. A summing unit 200 combines the number of predicted JDI instructions in predicted JDI pipe 120 and the number of unpredicted JDI instructions in unpredicted JDI pipe 122 to provide the total number of JDI instructions, sumt(jdi), in transit through pipes 120 and 122. A summing unit 202 combines the number of JDI instructions in transit, sumt(jdi), the read pointer, ff_rdptr, and the number of predicted JDI instructions, sum(pjdi), in the early stages of pipeline 20 to provide the branch predictor read pointer, bp_rdptr. As indicated above, the branch predictor read pointer points to the target address in JDI memory 32 of the next JDI instruction to enter the pipeline.

As further shown in FIG. 3, JDI control logic 100 includes summing units 210, 212 and 214 which combine the values according to equation (2) above to provide the future FIFO size, future_fifo_size. The future FIFO size is provided to DAG offset and fetch size logic 220. The DAG offset and fetch size logic 220 provides fetch size and offset values to prefetch register 142 (FIG. 2) according to Table 2 below.

TABLE 2

| Future_fifo_size | JDI in stage E | Offset | Fetch_size | Fifo size increase |
|---|---|---|---|---|
| 0 | 0 | 1 | 2 | 2 |
| 1 | 0 | 1 | 2 | 1 |
| 2 | 0 | 2 | 2 | 1 |
| 3 | 0 | 3 | 2 | 1 |
| 4 | 0 | 4 | 1 | 0 |
| 0 | 1 | 2 | 2 | 1 |
| 1 | 1 | 2 | 2 | 1 |
| 2 | 1 | 3 | 2 | 1 |
| 3 | 1 | 4 | 1 | 0 |
| 4 | 1 | 4 | 1 | 0 |

In Table 2, the "future_fifo_size" column represents the state of JDI memory 32 when all JDI instructions currently in transit through pipes 120 and 122 have committed and written any prefetched target addresses to JDI memory 32. The "JDI in stage E" column accounts for an unlikely but possible condition where a JDI instruction is in stage E of the pipeline when the current JDI instruction is in stage D. The "offset" column represents the offset from the current target address in memory table 34 to the first target address to be prefetched. The "fetch_size" column represents the number of target addresses to be prefetched. The "fifo size increase" column represents the net change in the number of target addresses in JDI memory 32 when the current JDI instruction commits.

A decoded JDI instruction prefetches two target addresses from memory table 34 if it is known that the JDI memory 32 will not be full when the JDI instruction commits. Otherwise, one target address is prefetched. Prefetching two target addresses allows the JDI memory 32 to be filled, such that a number of future target addresses, equal to the JDI memory depth, are available for prediction. It can be determined whether the JDI memory 32 will be full when the JDI instruction commits by summing the changes that each JDI instruction in the pipeline will contribute to the JDI memory upon commit. For example, if the JDI memory is empty and a first JDI instruction, JDI0, is decoded, then it is known that the JDI memory will hold two target addresses when instruction JDI0 commits.

A first JDI instruction writes two target addresses to the JDI memory, but retires none if the JDI memory was empty. If a second instruction JDI1 is decoded a short time later, it is known that the JDI memory will then hold three target addresses once instruction JDI1 commits. This is because instruction JDI1 prefetches two addresses but retires one entry from the JDI memory (an entry that was prefetched by instruction JDI0). If the future number of entries equals the depth of the JDI memory, then one target address is prefetched. A JDI instruction retires its own target address from a full JDI memory and writes one prefetched address immediately in its place, keeping the JDI memory in a full state.

An example of prefetching of future target addresses is now described. Assume that JDI memory 32 has four locations and that memory table 34 contains target addresses adr0-adr3, which correspond to instructions JDI0-JDI3, respectively. When the JDI memory 32 is empty, pointer register 140 points to address adr0 and prefetch register 142 points to address adr1. Instruction JDI0 points to address adr0 and causes addresses adr1 and adr2 to be prefetched. The JDI memory 32 thus contains addresses adr1 and adr2 when instruction JDI0 commits. Address adr0 was not placed in JDI memory 32 and thus is not retired from JDI memory 32 when instruction JDI0 commits.

When instruction JDI1 is in the pipeline, it points to target address adr1 and two entries are detected in JDI memory 32. Thus, instruction JDI1 prefetches addresses adr3 and adr4 from memory table 34. Instruction JDI1 retires address adr1 when it commits, thus leaving addresses adr2, adr3 and adr4 in the JDI memory 32. Similarly, instruction JDI2 prefetches addresses adr5 and adr6 from the memory table 34 and retires address adr2 when it commits. Thus, when instruction JDI2 commits, the JDI memory 32 is full with addresses adr3, adr4, adr5 and adr6.

From then on, each remaining JDI instruction prefetches one address from memory table 34 and retires one address from the JDI memory 32 is upon commit. The JDI memory 32 remains in a full state, and the addresses of up to four future JDI instructions are available for prediction by the branch prediction pointer.

Figure 4A:
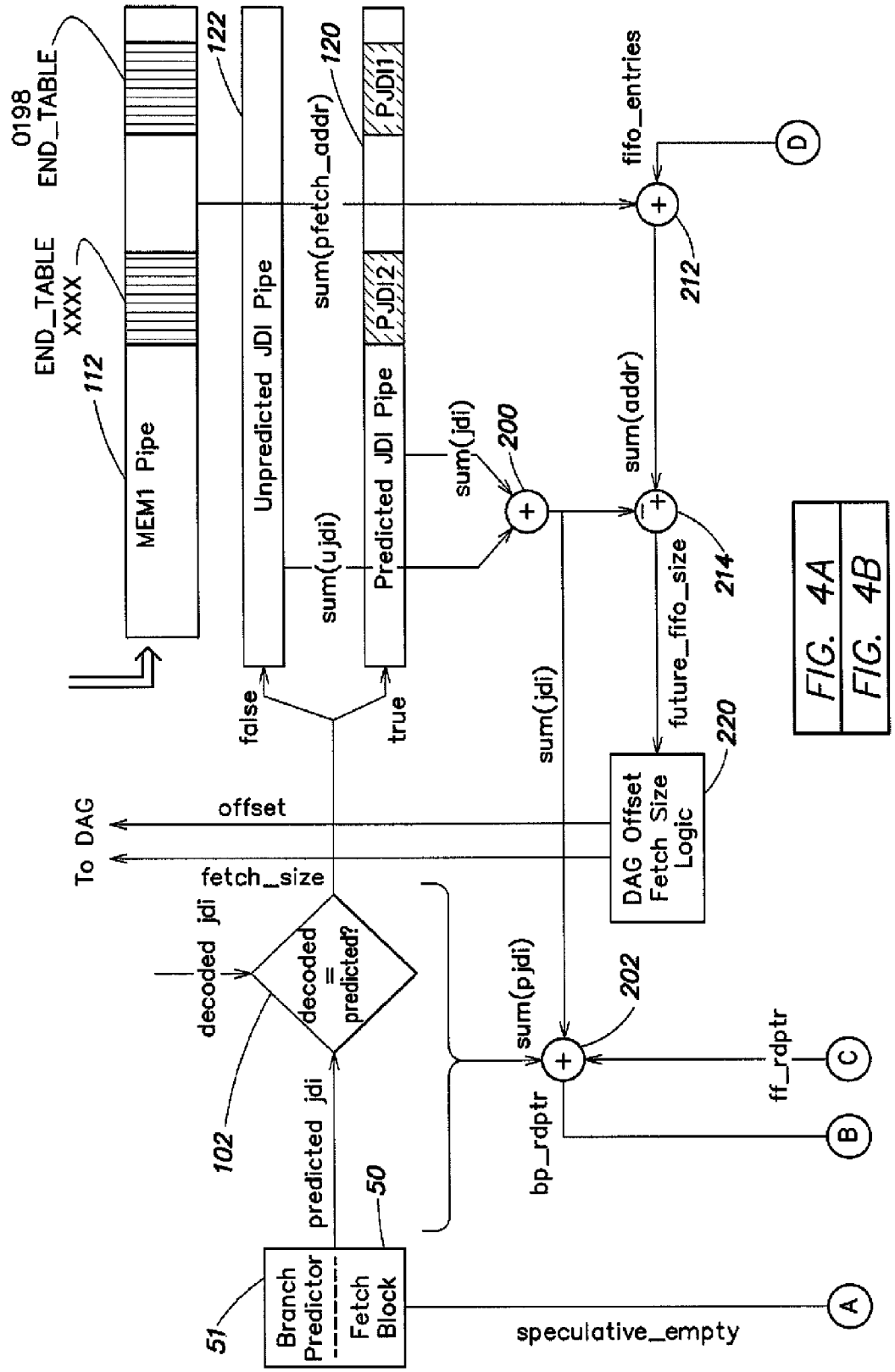
FIG. 4 is a block diagram of the jump control apparatus, illustrating detection of a speculative empty condition in the local memory.
Figure 4B:
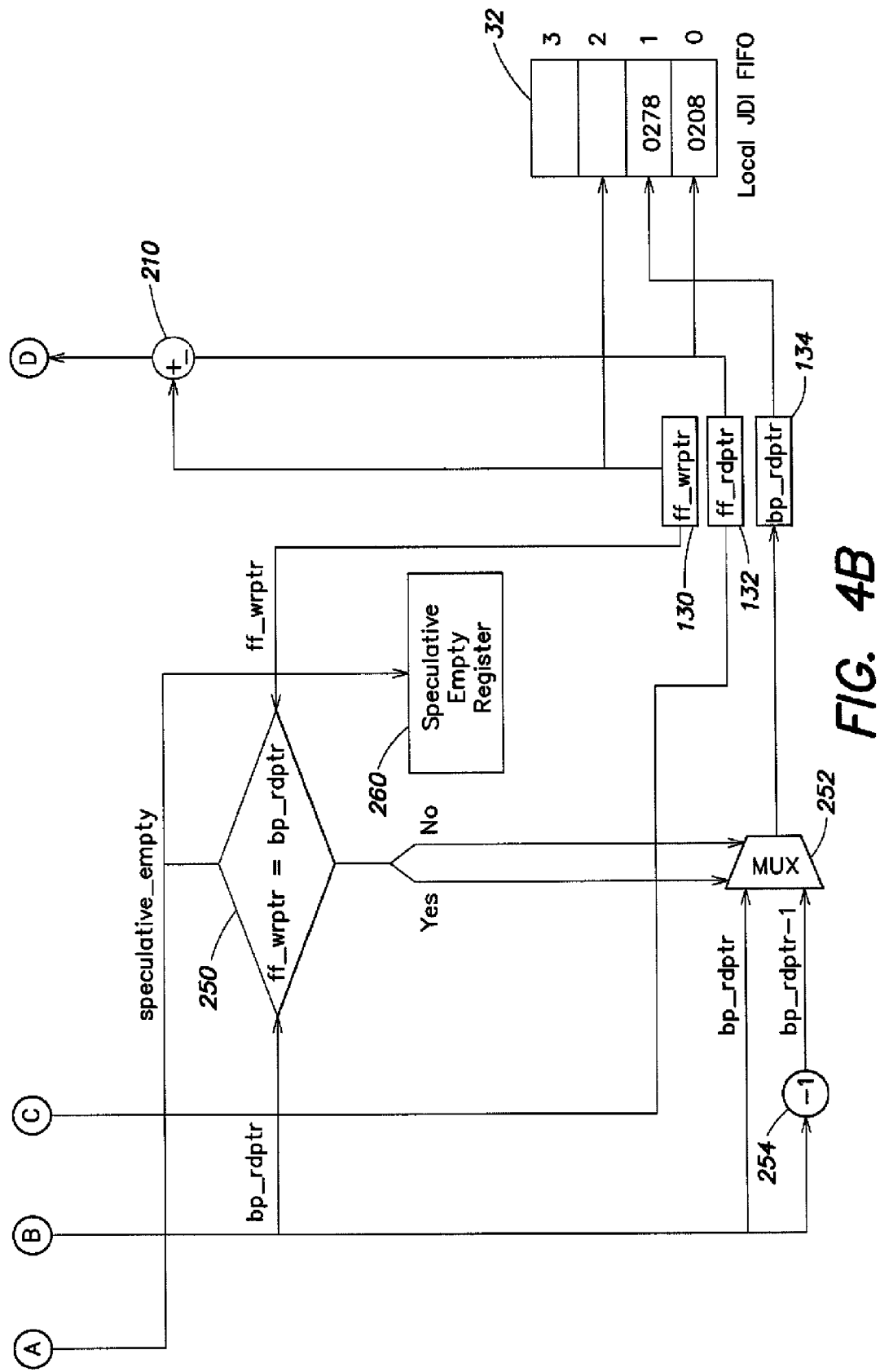

In the case where several JDI instructions enter the pipeline in quick succession, the branch predictor read pointer, bp_rdptr, may overrun the JDI memory write pointer, ff_wrptr, and point to a location in the JDI memory 32 where a prefetched target address has not yet been written. This is an error condition and requires that the processor wait until more prefetched target addresses are written to the JDI memory 32. To address this case, a speculative empty signal is generated as shown in FIG. 4. A comparator block 250 compares the branch predictor read pointer, bp_rdptr, and the JDI memory write pointer, ff_wrptr. If the two pointers are equal, the speculative empty signal is asserted. The speculative empty signal causes the fetch block 50 to go into a wait state. From then on, no more predicted JDI instructions are sent to the pipeline. The speculative empty signal is deasserted when additional target addresses are written to the JDI memory, and operation resumes.

The speculative empty signal also provides a correction factor in equation (1) for the branch predictor read pointer, bp_rdptr, to avoid pointing to an unwritten location in JDI memory 32. Referring again to FIG. 4, the speculative empty signal is supplied to the control input of a multiplexer 252. The multiplexer 252 supplies the normal branch predictor read pointer, bp_rdptr, to JDI memory 32 when the speculative empty signal is deasserted and supplies the branch predictor read pointer decremented by one when the speculative empty signal is asserted. A summing unit 254 decrements the branch predictor read pointer.

When the speculative empty signal is asserted, the current JDI memory write pointer, ff_wrptr, is stored as a speculative empty pointer, spec_empty_ptr, in a register 260. The speculative empty pointer enables later identification of a JDI instruction that tries to retire the corresponding location in the JDI memory 32. The identified JDI instruction is the instruction that was in the wait state and whose address was not dispensed by the branch predictor read pointer, bp_rdptr, since its address had not been written to the JDI memory.

The write pointer, ff_wrptr, points to the next location in the JDI memory that can be written. If the branch predictor predicts JDI instructions at a high rate, the branch predictor read pointer, bp_rdptr, will catch up to the write pointer, ff_wrptr, causing a speculative empty state. If a JDI instruction was predicted while in the speculative empty state, that JDI instruction is tagged as a speculative empty JDI instruction. The target address of the speculative empty JDI instruction was not available for prediction from the JDI memory when the JDI instruction was predicted by the branch predictor.

The processor remains in a speculative empty state until; (1) a normal JDI instruction in the pipeline has committed and written more entries to the JDI memory and no predictions were made during that time, i.e., a speculative empty JDI instruction was not predicted during that time, or (2) a speculative empty JDI instruction reaches the end of the pipeline. The speculative empty JDI instruction causes a mispredict signal in the commit stage, which clears the pipeline. The speculative empty JDI instruction simultaneously forces a jump to the target address provided by the pointer register 140. The mispredict signal also clears the speculative empty state, so that the fetch stage 50 can resume fetching instructions.

If the rate of JDI predictions is high, a fourth JDI instruction tends to be a speculative empty JDI. The JDI0 instruction writes target addresses 1 and 2 in the JDI memory 32. If instructions JDI1 and JDI2 are predicted shortly thereafter, instruction JDI3 will turn on the speculative empty state because target address 3 has not yet been written to the JDI memory. If instruction JDI1 reaches the commit stage and writes target address 3 to the JDI memory before the branch predictor predicts instruction JDI3, the speculative empty state will turn off without a mispredict. If instruction JDI3 is predicted before target address 3 is written to the JDI memory, the speculative empty state will turn off when instruction JDI3 causes a mispredict signal in the commit stage. The mispredict signal indicates that the target address for instruction JDI3 was not provided when it was predicted.

Figure 5A:
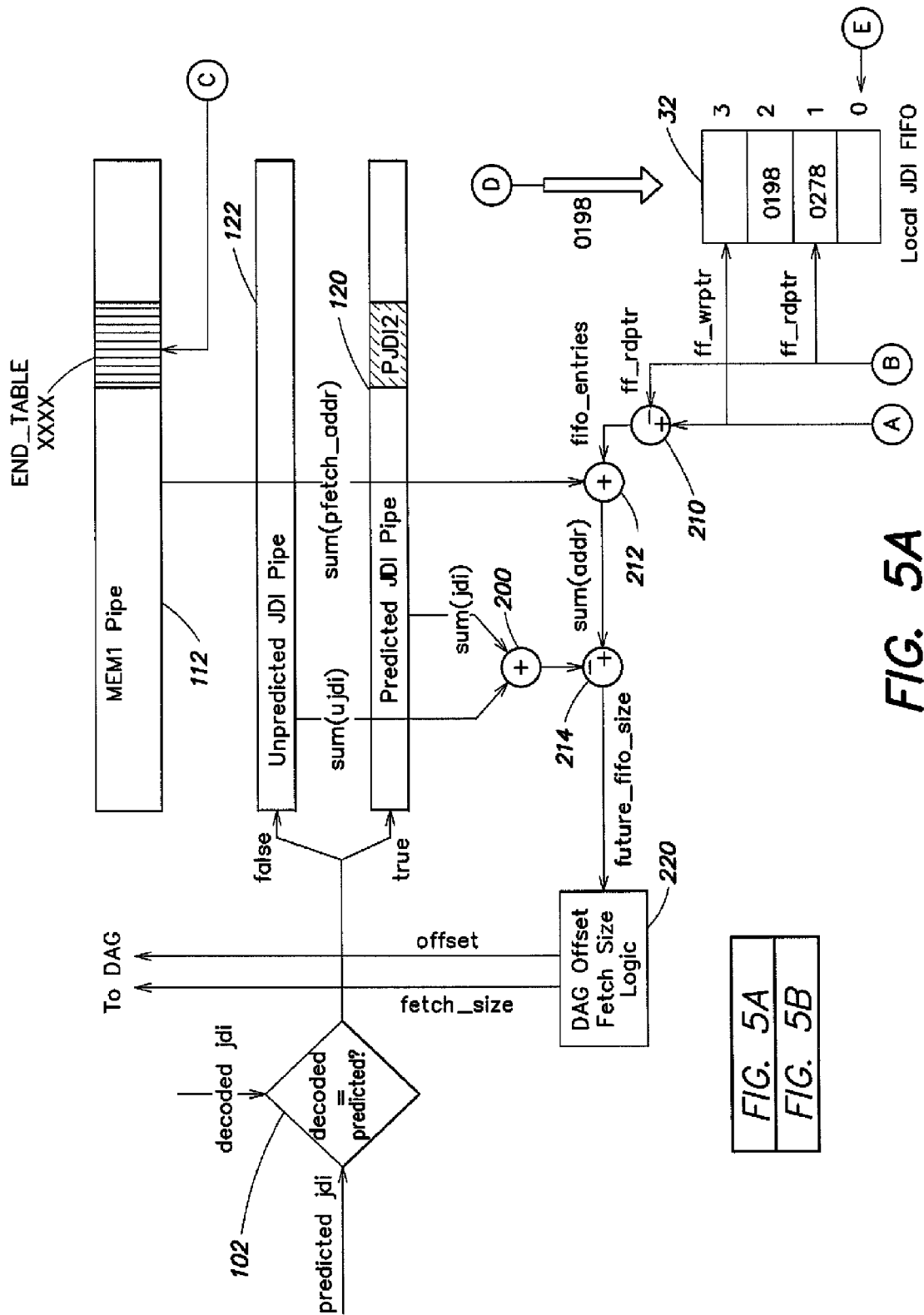
FIG. 5 is a block diagram of the jump control apparatus, illustrating control of the local memory.
Figure 5B:
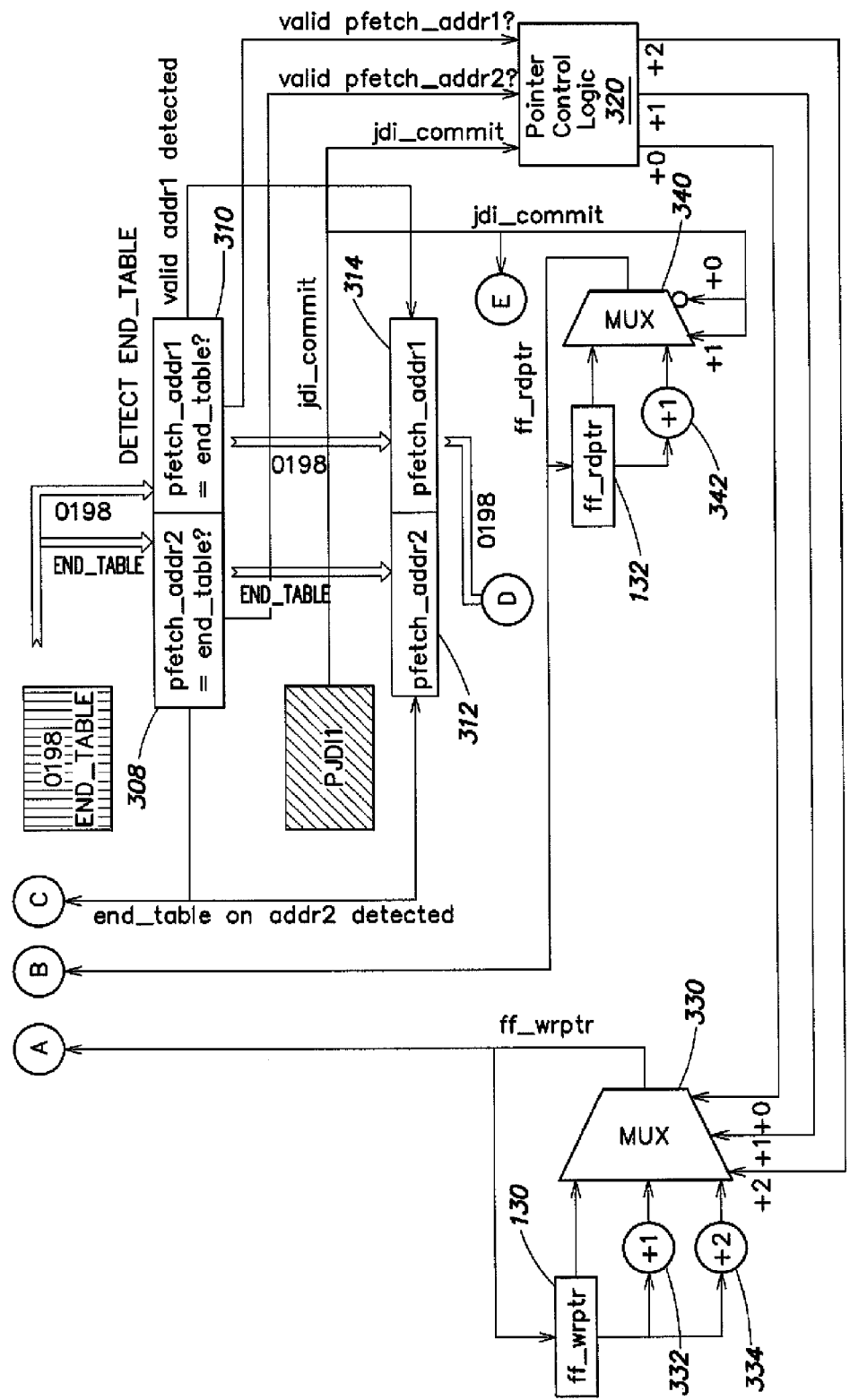
Figure 6A:
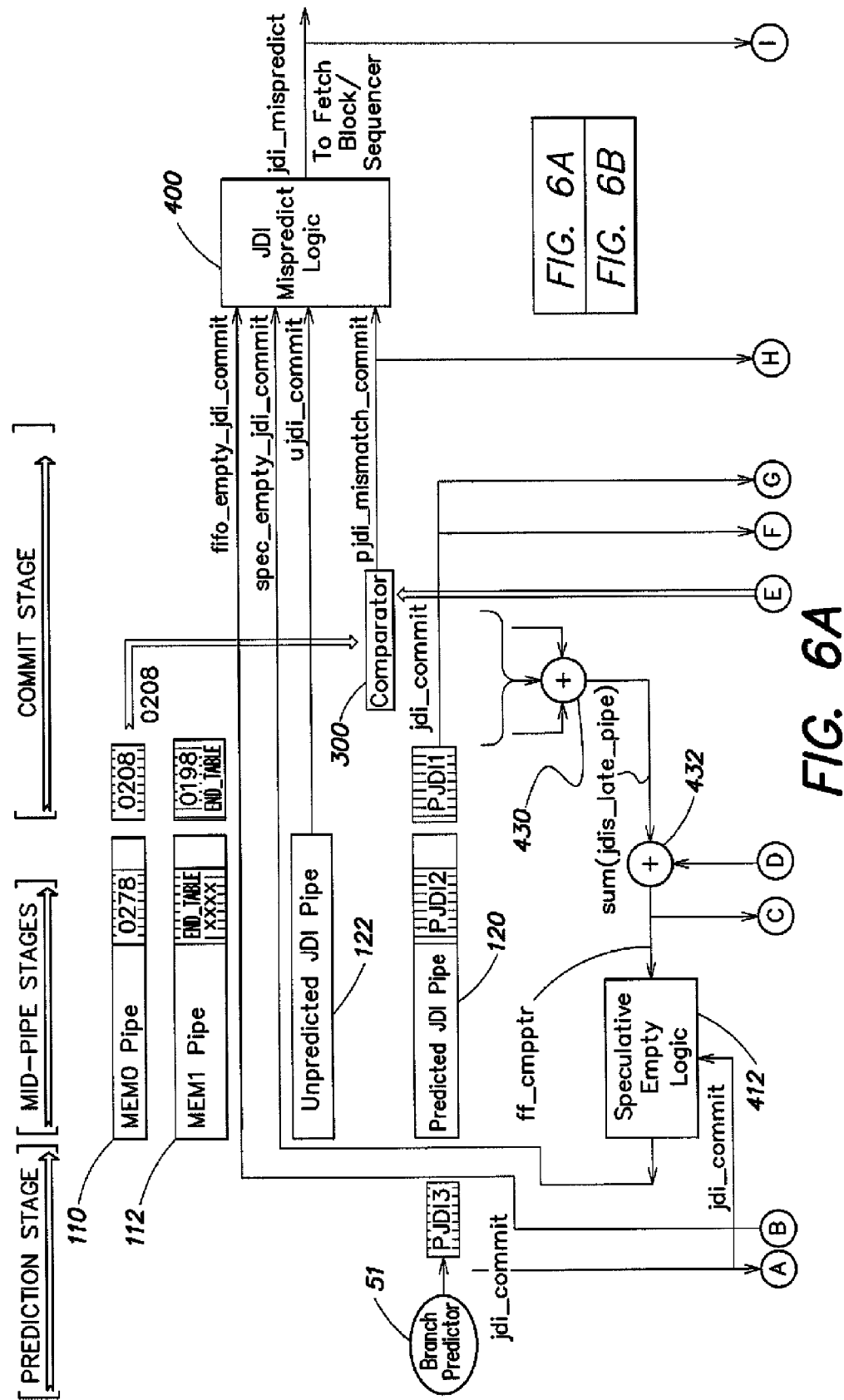
FIG. 6 is a block diagram of the jump control apparatus, illustrating the handling of a mispredict condition.
Figure 6B:
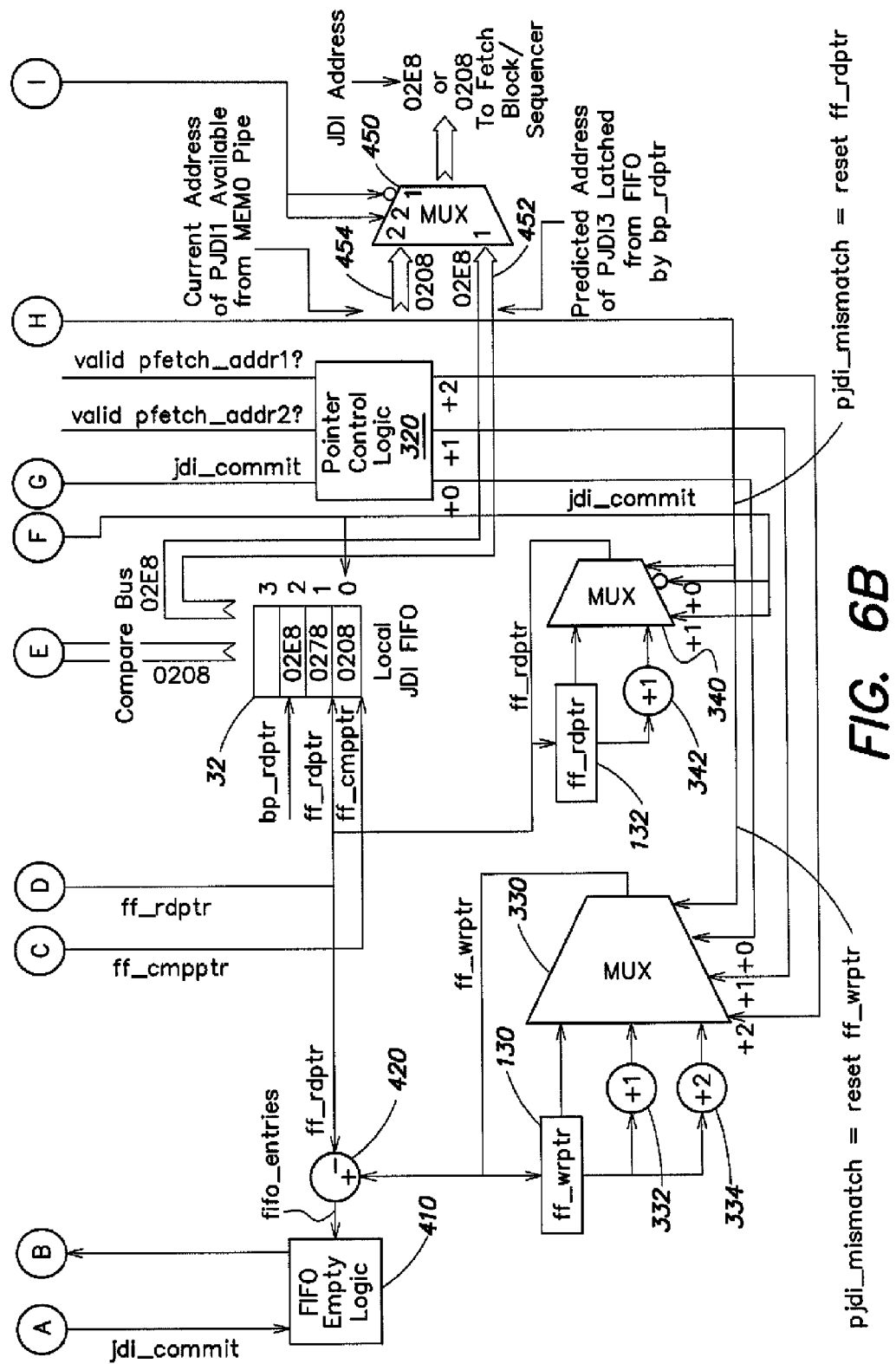

Additional JDI control functions are illustrated in FIGS. 5 and 6. The target address of a JDI instruction advancing through predicted JDI pipe 120 is loaded from memory table 34 into MEM0 pipe 110 (FIG. 6). The target address from MEM0 pipe 110 is compared with the prefetched target address that should be retired from JDI memory 32. The comparison is made by a comparator 300 shown in FIG. 6. Comparator 300 is located in stage J of pipeline 20. If the target address from MEM0 pipe 110 does not match the prefetched target address from JDI memory 32, a JDI mispredict signal is generated.

Assuming the target address in MEM0 pipe 110 matches the target address from JDI memory 32, the JDI instruction in the commit stage 61 retires the corresponding entry from JDI memory 32, writes the prefetched addresses into the JDI memory 32 and updates the read pointer and the write pointer of JDI memory 32.

Referring to FIG. 5, the JDI control logic 100 includes end_table detectors 308 and 310 to determine if the prefetched target addresses have reached the end of memory table 34. The target addresses are supplied from end_table detectors 308 and 310 to registers 312 and 314. The end_table detect logic 308 and 310 monitors the prefetched target addresses advancing through MEM1 pipe 112. If the end_table marker is detected at the output of the MEM1 pipe 112, the end_table marker is blocked from being written into the JDI memory 32. In the example of FIG. 5, two target addresses were prefetched. The first prefetched target address, 0198, was valid and was written into the JDI memory 32. The second prefetched target address was an end_table marker. In response to detection of the end_table marker, a cancel prefetch signal is sent to the MEM1 pipe 112 to cancel the prefetched target addresses still advancing through the pipe 112. These target addresses are outside the range of the defined memory table 34. The cancel prefetch signal is utilized so that the variable sum(pfetch_addr) from MEM1 pipe 112 is corrected. As a result, the future FIFO size parameter is readjusted to cause the prefetch pointer in prefetch register 142 to point to the end_table location in memory table 34. This forces new JDI instructions entering the pipeline to prefetch the end_table marker.

As shown in FIG. 5, pointer control logic 320 receives a JDI commit signal from predicted JDI pipe 120 and valid prefetch address signals from end_table detectors 308 and 310. The pointer control logic 320 computes the number of valid prefetch addresses and provides control signals to a multiplexer 330. The control signals indicate the number of valid prefetch addresses as 0, 1 or 2. Multiplexer 330 receives at its inputs the write pointer, ff_wrptr, of JDI memory 32, the write pointer incremented by +1, by a summing unit 332, and the write pointer incremented by +2, by a summing unit 334. The output of multiplexer 330 provides an updated write pointer to JDI memory 32.

The retire entry signal, which is generated when a JDI instruction commits, causes the corresponding target entry to be retired from JDI memory 32 and is used to update the read pointer, ff_rdptr, of JDI memory 32. The retire entry signal is provided as a control signal to a multiplexer 340. Multiplexer 340 receives at its inputs the read pointer, ff_rdptr, and the read pointer incremented by +1, by a summing unit 342. The output of multiplexer 340 is the updated read pointer.

Several conditions, referred to herein as "JDI mispredict" conditions, cause the pipeline to be cleared, thus incurring a JDI mispredict penalty. The following conditions generate a JDI mispredict: (1) a first JDI instruction that commits and it is determined that the local JDI memory does not contain the target address for that JDI instruction (FIFO empty); (2) a speculative empty condition as described above, i.e., a JDI instruction that was predicted when the branch predictor read pointer, bp_rdptr, had overrun the write pointer, ff_wrptr, of the JDI memory 32; (3) an unpredicted JDI instruction that is committing; and (4) a predicted JDI instruction whose address in the JDI memory 32 does not match the target address from memory table 34.

Referring to FIG. 6, JDI mispredict logic 400 receives signals representing the above mispredict conditions and supplies a JDI mispredict signal to fetch block 50 and to the program sequencer of computation core 10. The JDI mispredict signal also controls the output of the JDI target address to the fetch block and to the program sequencer as described below. The JDI mispredict signal causes the pipeline to be cleared. JDI mispredict logic 400 receives a predicted JDI mismatch signal from comparator 300 and receives an unpredicted JDI commit signal from unpredicted JDI pipe 122. In addition, JDI mispredict logic 400 receives a FIFO empty signal from FIFO empty logic 410 and a speculative empty signal from speculative empty logic 412. If any signal indicative of a mispredict condition is asserted, the JDI mispredict signal is asserted and causes the pipeline to be cleared.

To determine the FIFO empty mispredict condition, a summing unit 420 subtracts the read pointer, ff_rdptr, from the write pointer, f_wrptr, to determine a number of entries in JDI memory 32. If the number of entries is zero when the JDI instruction commits, as determined by FIFO empty logic 410, a FIFO empty mispredict signal is provided to JDI mispredict logic 400.

A commit pointer, ff_cmpptr, determines which address from JDI memory 32 a committing JDI instruction should retire. A summing unit 430 determines a sum of JDI instructions in the last three stages of the predicted JDI pipe 120. A summing unit 432 combines the result of summing unit 430 with the read pointer, ff_rdptr, to provide the commit pointer, ff_cmpptr. The commit pointer is provided to JDI memory 32 and to speculative empty logic 412. If the commit pointer, ff_cmpptr, is equal to the speculative empty pointer when the JDI instruction commits, as determined by speculative empty logic 412, a speculative empty mispredict signal is provided to JDI mispredict logic 400.

As shown in FIG. 6, a multiplexer 450 in the commit stage receives, at a first input 452, a predicted target address from local JDI memory 32. The predicted target address is accessed in local JDI memory 32 by the branch predictor read pointer, bp_rdptr. In the example of FIG. 6, the predicted target address of JDI instruction pjdi3 in branch predictor 51 is supplied to the first input 452 of multiplexer 450. Multiplexer 450 receives, at a second input 454, the target address of the current JDI instruction in the commit stage from MEM0 pipe 110. The multiplexer 450 is controlled by the JDI mispredict signal from JDI mispredict logic 400. In particular, when the JDI mispredict signal is not asserted, multiplexer 450 supplies the predicted target address to the fetch block and the program sequencer as the JDI target address. When the JDI mispredict signal is asserted, multiplexer 450 supplies the target address of the current JDI instruction in the commit stage as the JDI target address.

Figure 7A:
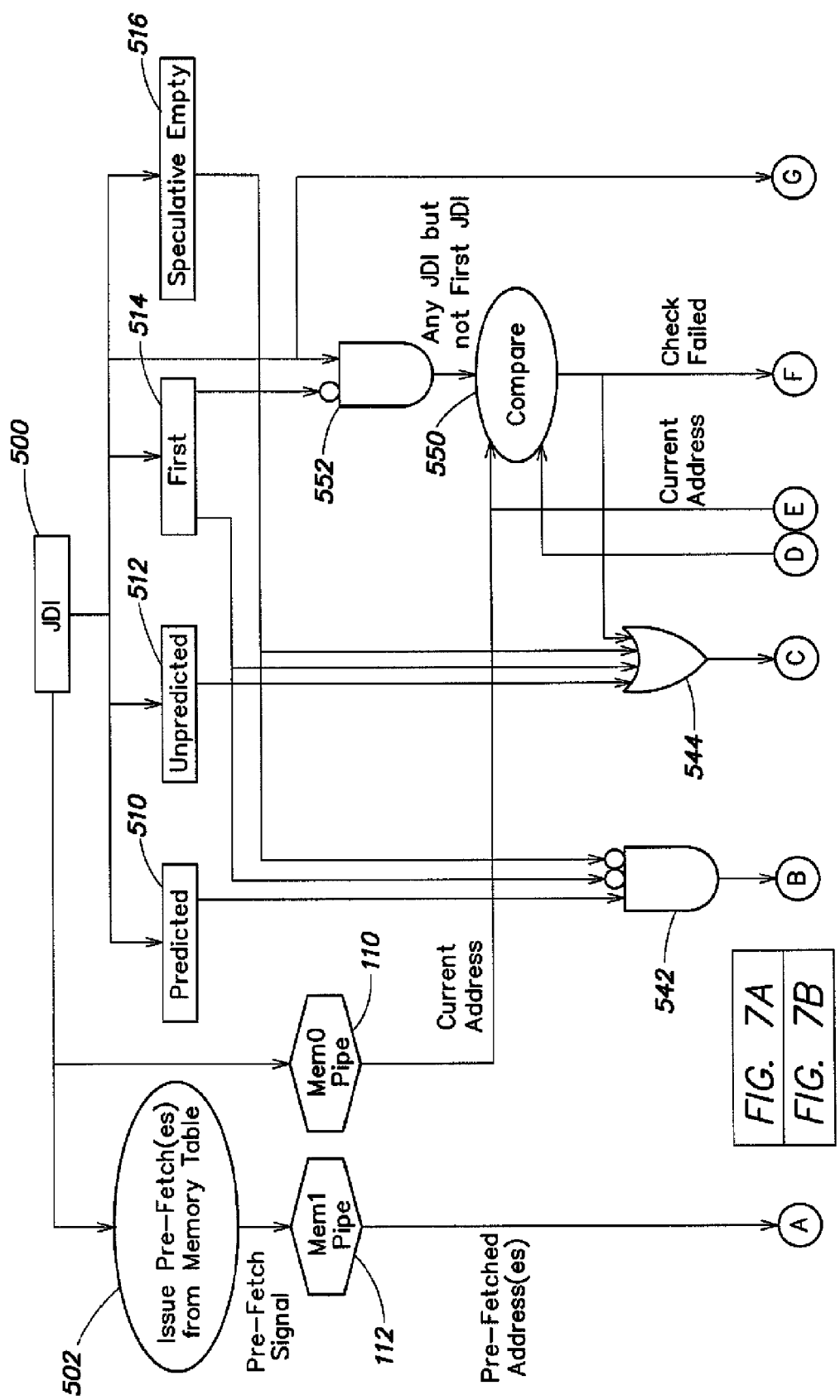
FIG. 7 is a schematic diagram illustrating operation of the jump control apparatus in accordance with embodiments of the invention.
Figure 7B:
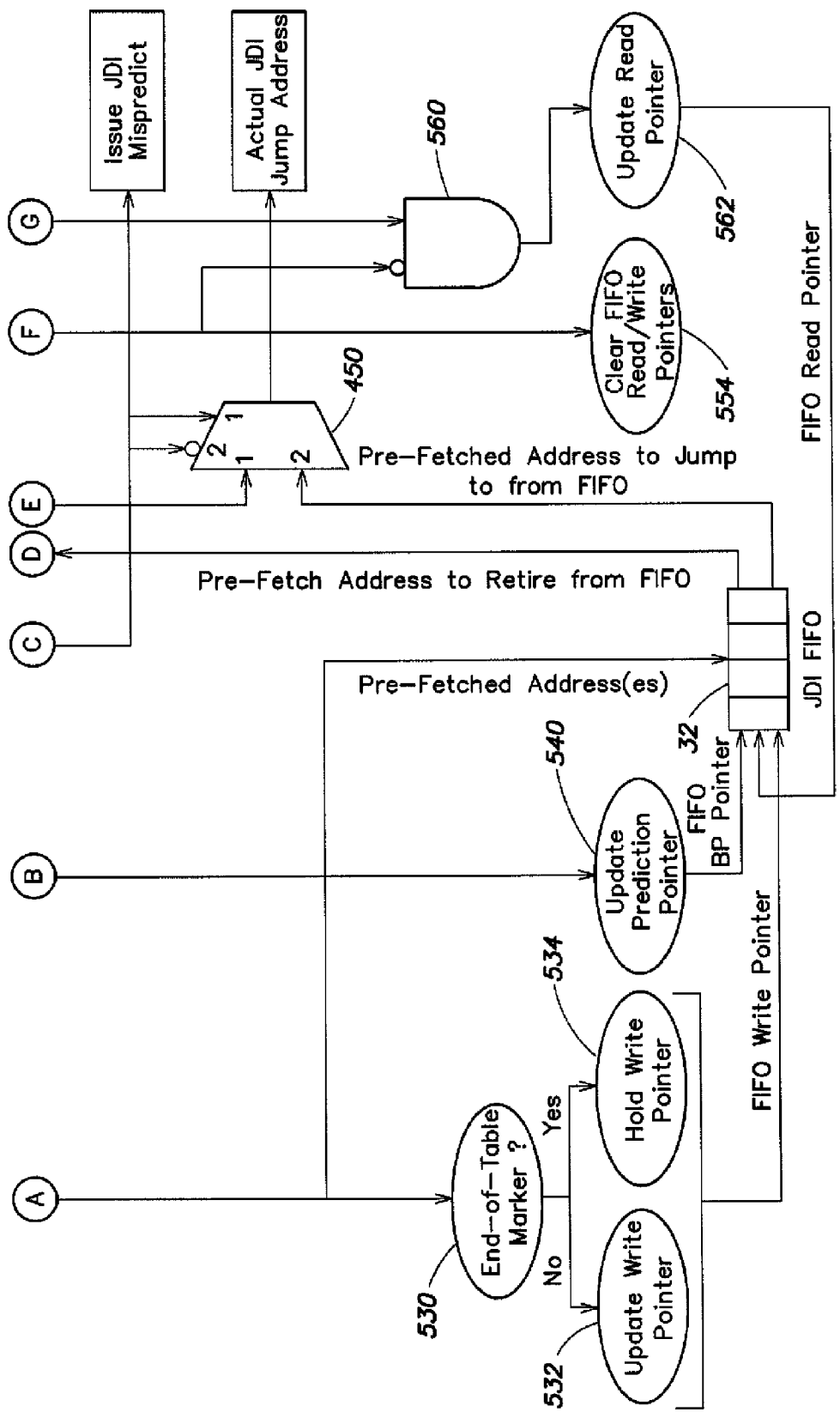

The processing of JDI instructions is illustrated in the schematic diagram of FIG. 7. In FIG. 7, the pipelined architecture of the processor is ignored for ease of understanding. A JDI instruction is detected in the sequence of instructions in block 500. The target address of the detected JDI instruction is loaded into MEM0 pipe 110. Future target addresses are prefetched from the memory table 34 in act 502, and the prefetched target addresses are loaded into MEM1 pipe 112. The JDI instruction is identified during processing as predicted in block 510, unpredicted in block 512, a first JDI instruction to be processed in block 514 or a speculative empty JDI instruction in block 516. An end-table marker from MEM1 pipe 112 is detected in act 530. If an end-table marker is not detected, the write pointer of local JDI memory 32 is updated in act 532. If an end-table marker is detected, the write pointer of JDI memory 32 is held at its current state in act 534. The prefetched target addresses are written to local JDI memory 32 when the detected JDI instruction commits.

Updating of the branch predictor read pointer in act 540 is controlled by a logic function 542. In particular, the branch predictor read pointer is updated if the JDI instruction is predicted, is not the first JDI instruction, and is not a speculative empty JDI instruction, as determined by logic function 542.

A mispredict condition is determined by logic function 544. In particular, a JDI mispredict condition is indicated if the JDI instruction is unpredicted, is the first JDI instruction, is a speculative empty JDI instruction, or the prefetch address from JDI memory 32 does not match the current address from MEM0 pipe 110. In any of these conditions, a JDI mispredict signal is issued to the fetch block and the program sequencer. The JDI mispredict signal is also supplied as a control signal to multiplexer 450.

In act 550, the target address of the current JDI instruction in the commit stage is compared with the prefetch address from JDI memory 32. The comparison is made, according to logic function 552, for any JDI instruction except the first JDI instruction. If the comparison of act 550 failed (the target address of the current JDI instruction does not match the prefetched target address), the read and write pointers for JDI memory 32 are cleared in act 554. The comparison result is also supplied to logic function 544 and to a logic function 560. If the comparison of act 550 did not fail for any JDI instruction (the target address of the current JDI instruction matches the prefetched target address), the read pointer of JDI memory 32 is updated in act 562, effectively retiring the prefetched target address.

As described above, multiplexer 450 outputs the prefetched target address from JDI memory 32 as the JDI target address if the JDI mispredict signal is not asserted and outputs the current address from MEM0 pipe 110 if the JDI mispredict signal is asserted. The JDI target address is supplied to the fetch block and the program sequencer for further processing.

A technique for enhancing performance is described with reference to Table 1 above. Assume that subroutines starting at target addresses 0198, 0208 and 0278 are to be executed multiple times in a loop. Performance can be enhanced by writing an extra target address in memory table 34. In particular, the target address of the first JDI instruction in a series of JDI instructions to be executed multiple times is written in memory table 34 at the beginning of the series of JDI instructions and again at the end. As shown in Table 1, target address 0198 is written at the beginning of memory table 34 and again at the end of the series of JDI instructions to be executed multiple times. This technique avoids a JDI mispredict penalty each time the last JDI instruction in the series executes, except on the first execution of the loop.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for performing a jump operation in a pipelined digital processor, comprising:
    writing target addresses of jump instructions to be executed by the processor to a memory table;
    detecting a first jump instruction being executed by the processor, the first jump instruction referencing a pointer to a first target address in the memory table;
    the processor executing the first jump instruction by:
    jumping to the first target address; and
    modifying the pointer to point to a second target address in the memory table, the second target address corresponding to a second jump instruction.

2. A method as defined in claim 1, wherein executing the first jump instruction further comprises prefetching at least one future target address from the memory table and writing the at least one future target address in a local memory.

3. A method as defined in claim 2, further comprising accessing the second target address in the local memory in response to detection of the second jump instruction.

4. A method as defined in claim 1, wherein modifying the pointer comprises post incrementing the pointer.

5. A method as defined in claim 1, wherein executing the first jump instruction further comprises accessing the first target address in the memory table.

6. A method as defined in claim 1, further comprising precomputing the target addresses to be written into the memory table prior to execution of the sequence of instructions.

7. A method as defined in claim 3, further comprising retiring the second target address from the local memory when the second jump instruction commits.

8. A method as defined in claim 3, wherein the at least one future target address is written to the local memory when the first jump instruction commits.

9. A method as defined in claim 3, wherein prefetching at least one future target address comprises prefetching two future target addresses when the local memory is not full.

10. A method as defined in claim 3, wherein the digital processor includes a pipeline, further comprising clearing the pipeline in response to detection of a mispredict condition.

11. A method as defined in claim 1, wherein detecting the first jump instruction is performed by a branch predictor in the processor.

12. A method as defined in claim 1, wherein writing target addresses to the memory table includes writing the target address of a jump instruction at the beginning of a series of jump instructions to be executed multiple times and again at the end of the series of jump instructions.

13. A method for performing a jump operation in a pipelined digital processor having a branch predictor, comprising:
    writing target addresses of jump instructions to be executed by the processor to a memory table;
    providing a jump instruction in an instruction set architecture of the processor, the jump instruction referencing a pointer to a target address in the memory table;
    in response to the branch predictor detecting a first jump instruction, jumping to a first target address; and
    modifying the pointer to point to a second target address in the memory table, the second target address corresponding to a second jump instruction.

14. A method as defined in claim 13, further comprising prefetching at least one future target address from the memory table and writing the at least one future target address in a local memory.

15. A method as defined in claim 14, further comprising accessing the second target address in the local memory in response to the branch predictor detecting the second jump instruction.

16. A method as defined in claim 15, further comprising retiring the second target address from the local memory when the second jump instruction commits.

17. A method as defined in claim 15, wherein the at least one future target address is written to the local memory when the first jump instruction commits.

18. A method as defined in claim 15, wherein prefetching at least one future target address comprises prefetching two future target addresses when the local memory is not full.

19. A method as defined in claim 15, wherein the digital processor includes a pipeline, further comprising clearing the pipeline in response to detection of a mispredict condition.

20. A method as defined in claim 13, wherein modifying the pointer comprises post incrementing the pointer.

21. A method as defined in claim 13, wherein jumping to the first target address comprises providing the first target address to an instruction fetch stage of the processor.

22. A method as defined in claim 13, wherein writing target addresses to the memory table includes writing the target address of a jump instruction at the beginning of a series of jump instructions to be executed multiple times and again at the end of the series of jump instructions.

23. Apparatus for performing a jump operation in a pipelined digital processor, comprising:
    a memory table to store target addresses of jump instructions to be executed;
    a local memory; and
    a jump instruction control unit to control execution of a jump instruction that references a pointer to a target address in the memory table, the jump instruction control unit responsive to a first jump instruction to jump to a first target address, to modify the pointer to point to a second target address in the memory table, to prefetch at least one future target address from the memory table and to write the at least one future target address in the local memory.

24. Apparatus as defined in claim 23, wherein the jump instruction control unit is configured to access the second target address in the local memory in response to detection of the second jump instruction.

25. Apparatus as defined in claim 24, wherein the jump instruction control unit is further configured to retire the second target address from the local memory when the second jump instruction commits.

26. Apparatus as defined in claim 24, wherein the jump instruction control unit is configured to write the at least one future target address to the local memory when the first jump instruction commits.

27. Apparatus as defined in claim 24, wherein the jump instruction control unit is configured to prefetch two future target addresses when the local memory is not full.

28. Apparatus as defined in claim 24, wherein the digital processor includes a pipeline, and wherein the jump instruction control unit is configured to clear the pipeline in response to detection of a mispredict condition.

29. A method for performing a jump operation in a pipelined digital processor, comprising:
    writing target addresses of jump instructions to be executed by the processor to a memory table;
    learning a first jump instruction with a branch predictor of the processor, the first jump instruction referencing a pointer to a first target address in the memory table;
    fetching the first jump instruction with a fetch block of the processor;
    detecting the first jump instruction with the branch predictor;
    reading the first target address corresponding to the first jump instruction from a local memory and providing the first target address to the fetch block of the processor;
    modifying the pointer to point to a second target address in the memory table, the second target address corresponding to a second jump instruction;
    prefetching a future target address from the memory table;
    writing the prefetched future target address to the local memory when the first jump instruction commits; and
    retiring the first target address from the local memory when the first jump instruction commits.

30. A method as defined in claim 29, further comprising detecting the second jump instruction and reading the second target address in the local memory.

31. A method as defined in claim 30, further comprising retiring the second target address from the local memory when the second jump instruction commits.

32. A method as defined in claim 30, wherein the digital processor includes a pipeline, further comprising clearing the pipeline in response to detection of a mispredict condition.

33. A method as defined in claim 29, wherein writing target addresses to the memory table includes writing the target address of a jump instruction at the beginning of a series of jump instructions to be executed multiple times and again at the end of the series of jump instructions.

* * * * *